United States Patent Office 3,474,105
Patented Oct. 21, 1969

3,474,105
PIPERIDYLMETHYL ANTHRACENES
Ernst Jucker, Ettingen, Anton Ebnother, Reinach, Basel-Land, and Andre Stoll, Birsfelden, Switzerland, assignors to Sandoz Ltd. (also known as Sandoz A.G.), Basel, Switzerland
No Drawing. Filed Mar. 24, 1966, Ser. No. 537,008
Claims priority, application Switzerland, Apr. 22, 1965, 5,569/65
Int. Cl. C07d 29/10, 29/00
U.S. Cl. 260—293                                  3 Claims

ABSTRACT OF THE DISCLOSURE 10,10-dimethyl-9,10-dihydroanthracene derivatives of the formula,

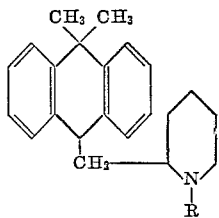

wherein R denotes hydrogen or methyl and pharmaceutically acceptable acid addition salts thereof. The compounds passes antidepressive and neuroleptic activity.

The present invention relates to new carbocyclic compounds and a process for their production.
The present invention provides 10,10-dimethyl-9,10-dihydroanthracene derivatives of general Formula I,

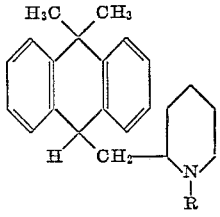

in which R signifies a hydrogen atom or the methyl radical, and their acid addition salts.
The present invention further provides a process for the production of the compounds of general Formula I and their acid addition salts, characterized in that 10,10-dimethyl - 9 - hydroxy - 9 - (2 - pyridylmethyl) - 9,10 - dihydro-anthracene of Formula III

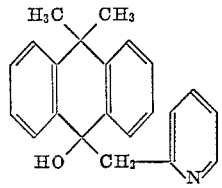

is catalytically hydrogenated at a temperature of from 70–100° C. and at a pressure of 3–10 Atm. to give a compound of Formula I, in which R signifies a hydrogen atom, which compound, when a compound I is desired in which R signifies a methyl radical, is methylated at the piperidine nitrogen atom in manner known per se, and, if an acid addition salt is desired, salification is effected in manner known per se.

The present invention further provides a process for the production of the compound I, in which R signifies the methyl radical, and its acid addition salts, characterized in that the compound III is reacted at a temperature of 50–100° C. with a methyl halide of general Formula IV,

$$CH_3-Hal \qquad (IV)$$

in which Hal signifies a chlorine, bromine or iodine atom, the resulting quaternary compound of general Formula V,

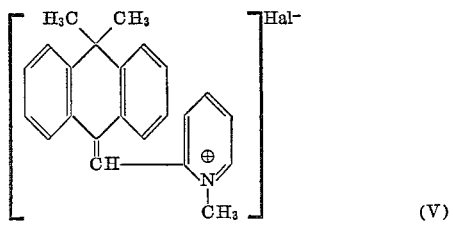

in which Hal has the above significance, is catalytically hydrogenated at a temperature of 70–100° C. and at a pressure of 3–10 Atm. and, when an acid addition salt is desired, salification is effected.

The compound III may be produced in that 10,10-dimethyl-anthrone-(9) of Formula II

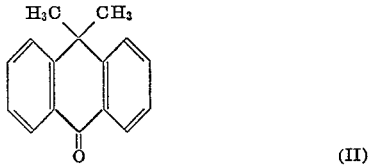

in an inert solvent, is added to an alkali metal derivative of 2-methylpyridine at a temperature of −10 to 20° C., the mixture is heated to 45–60° C. and the resulting reaction complex is hydrolyzed to give the desired compound III.

A specific method of effecting the process of the invention is as follows: 10,10-dimethyl-anthrone-(9) of Formula II, dissolved in an inert solvent, e.g. tetrahydrofuran, is added at 0° C. to a suspension of an alkali metal amide, e.g. lithium, sodium or potassium amide, in 2-methyl-pyridine and the reaction mixture is subsequently kept at 50° C. while stirring for 2 to 3 hours. Butyl-lithium may likewise be used in place of an alkali metal amide for the formation of the alkali metal derivative of 2-methyl-pyridine. After standing for several hours at room temperature, the reaction mixture is stirred with ice water and the precipitated oil extracted with a water immiscible solvent, e.g. dichloromethane. 10,10-dimethyl-9-hydroxy-9-(2-pyridylmethyl)-9,10-dihydro-anthracene (Formula III) is then isolated and purified in manner known per se. The final product of Formula I, in which R signifies a hydrogen atom, is obtained in that a compound of Formula III is catalytically hydrogenated at a pressure of from 3–10 Atm. and at a temperature of 70–100° C., in glacial acetic acid and in the presence of platinum oxide.

If desired, the resulting compound may be methylated at the piperidine nitrogen atom, by methylating with formaldehyde/formic acid. Methylation may also be effected in that the formyl or ethoxycarbonyl radical is first introduced onto the piperidine nitrogen atom and that these radicals are subsequently converted to the methyl radical with lithium aluminium hydride or diborane in manner known per se.

The final product of Formula I ($R=CH_3$) may also be produced in that a compound of Formula III is first quaternized, preferably by treating with methyl bromide or methyl iodide at an elevated temperature in an autoclave and catalytically hydrogenating the resulting quaternary compound of Formula V in methanol and in the presence of platinum oxide at an elevated temperature and elevated pressure.

The resulting final products of Formula I are isolated from the reaction mixture in manner known per se. They are preferably purified by conversion into a suitable salt. Examples of acids for acid addition salt formation are: hydrochloric, hydrobromic, phosphoric, sulphuric, acetic, malonic, fumaric, maleic, tartaric, hexahydrobenzoic and p-toluenesulphonic acid.

The compounds of Formula I have valuable pharmacodynamic properties. Thus, they are characterized by strong effects which are typical of antidepressives. In tests with animals these effects are manifested, inter alia, by an inhibition of the vegetative and motor symptoms produced by reserpine or tetrabenazine, a potentiation of the effect of noradrenalin and certain sedative and anticholinergic effects. The antidepressive effect is specific whilst the neuroleptic properties are of secondary importance. The toxicity of the compounds of the invention is relatively low.

Compounds I are indicated for use in the treatment of neurotic and psychotic disorders, especially depressive conditions, and in the treatment of psychosomatic disorders. They are preferably administered in the form of their water-soluble, physiologically tolerated salts.

A suitable daily dosage is from 10 to 200 mg.

The compounds of the invention may be used as pharmaceuticals on their own or in the form of appropriate medicinal preparations for administration, e.g. enterally or parenterally. In order to produce suitable medicinal preparations the compounds are worked up with inorganic or organic adjuvants which are inert and physiologically acceptable. Examples of such adjuvants are as follows:

for tablets and dragées: lactose, starch, talc and stearic acid;
for injectable solutions: water, alcohols, glycerin and vegetable oils;
for suppositories: natural or hardened oils and waxes.

The preparations may furthermore contain suitable preserving, stabilizing and wetting agents, solubilizers, sweetening and colouring substances and flavourings.

The term "in manner known per se" as utilized herein designates methods in use or described in the literature on the subject.

In the following non-limitative examples all temperatures are indicated in degrees centigrade and are uncorrected.

EXAMPLE 1

10,10-dimethyl-9-(1-methyl-2-piperidylmethyl)-9,10-dihydro-anthracene (a) 10,10 - dimethyl - 9 - hydroxy - 9 - (2 - pyridylmethyl)-9,10-dihydro-anthracene.—A suspension of 7.0 g. of pulverized sodium amide in 30 cc. of 2-methyl-pyridine is stirred at 20° for 10 minutes, the mixture is cooled to 0°, a solution of 12.5 g. of 10,10-dimethyl-anthrone-(9) in 20 cc. of absolute tetrahydrofuran is added, the reaction mixture is slowly heated to 50°, stirring is effected at this temperature for 3 hours and the mixture is then allowed to stand for 15 hours. The mixture is subsequently stirred with 500 cc. of ice water, the precipitated oil is extracted with dichloromethane, the organic extract is washed with water, then with a 2 N aqueous tartaric acid solution and then once more with water. The residue obtained after drying the organic solution over sodium sulphate and evaporating the solvent, is first recrystallized from isopropanol and then from carbon tetrachloride. 10,10-dimethyl-9-hydroxy-9-(2-pyridylmethyl)-9,10-dihydro-anthracene has a melting point of 125–127°.

(b) 10,10 - dimethyl - 9 - (2 - pyridylmethylene) - 9,10-dihydroanthracene-metho-iodide.—13.0 g. of 10,10-dimethyl-9 - hydroxy - 9 - (2 - pyridylmethyl) - 9,10 - dihydro-anthracene and 65 cc. of methyl iodide are heated to 80° in an autoclave for 4 hours. After evaporating the excess methyl iodide at 15 mm. of Hg, the residue is rubbed and washed with ether. After crystallizing several times from ethanol the compound has a melting point of 242–246° (decomposition).

(c) 10,10 - dimethyl - 9 - (1 - methyl - 2 - piperidylmethyl)-9,10-dihydro-anthracene.—5.0 g. of 10,10-dimethyl - 9 - (2 - pyridylmethylene) - 9,10 - dihydro-anthracene-metho-iodide in 200 cc. of methanol are shaken with hydrogen at 80° and a pressure of 6 atmospheres in the presence of 0.5 g. of platinum oxide for 3 hours. The catalyst is subsequently removed by filtration and the filtrate evaporated to dryness at 15 mm. of Hg. The oily hydro-iodide obtained as residue is then dissolved in water, the aqueous solution filtered, made alkaline with a 2 N sodium hydroxide solution and the alkaline solution extracted with ether. After washing with water and drying over potassium carbonate the ether solution is evaporated at 15 mm. of Hg. The 10,10-dimethyl-9-(1-methyl-2-piperidylmethyl)-9,10-dihydro-anthracene obtained as residue is converted into the neutral naphthalene-disulphonate as follows: A warm solution of 1.3 g. of naphthalene-1,5-disulphonic acid in 5 cc. of ethanol is added to a solution of 2.80 g. of the base in 20 cc. of ethanol. The naphthalene-disulphonate which crystallizes upon cooling is recrystallized from ethanol. Melting point 249–253° (decomposition).

EXAMPLE 2

10,10-dimethyl-9-(2-piperidylmethyl)-9,10-dihydro-anthracene 6.0 g. of 10,10-dimethyl-9-hydroxy-9-(2-pyridylmethyl)-9,10-dihydro-anthracene [produced in accordance with Example 1a] in 60 cc. of glacial acetic acid are shaken with hydrogen at 80° and a pressure of 6 atmospheres in the presence of 0.60 g. of platinum oxide. After approximately 4 hours the catalyst is filtered off, the filtrate is evaporated to dryness at 15 mm. of Hg, the residue dissolved in 200 cc. of water, the turbid aqueous solution filtered through highly purified diatomaceous earth and made alkaline with a 2 N sodium hydroxide solution. The precipitated oil is taken up in ether, the ethereal solution extracted with a 2 N aqueous tartaric acid solution, the tartaric acid extract made alkaline with a 30% sodium hydroxide solution and again extracted with ether. After drying the ether extract and evaporating the solvent, 10,10-dimethyl - 9 - (2 - piperidylmethyl) - 9,10 - dihydro-anthracene is obtained as a viscous oil.

The hydrochloride has a melting point of 256° (decomposition) from methanol.

EXAMPLE 3

10,10-dimethyl-9-(1-methyl-2-piperidylmethyl)-9,10-dihydro-anthracene 3.31 g. of the base obtained in accordance with Example 2 are slowly heated to the boil together with 2.45 g. of formic acid and 1.3 cc. of 37% formaldehyde and kept at the boil for 8 hours. 12 cc. of a 2 N hydrochloric acid solution are then added to the reaction mixture and the solution is evaporated to dryness. The residue is then dissolved in 30 cc. of warm water and the aqueous solution made alkaline. The precipitated oil is extracted with ether, the ether solution washed with water, dried over potassium carbonate and evaporated at 15 mm. of Hg. The resulting 10,10 - dimethyl - 9 - (1 - methyl - 2 - piperidylmethyl)-9,10-dihydro-anthracene is converted into the neutral naphthalene-disulphonate in a manner analogous to that described in Example 1c. Melting point 249–253° (decomp.).

What is claimed is:

1. A compound selected from the group consisting of a compound of formula:

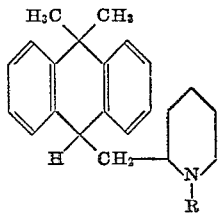

wherein R is hydrogen or methyl, and pharmaceutically acceptable acid addition salts thereof.

2. A compound according to claim 1, in which R is hydrogen.

3. A compound according to claim 1, in which R is methyl.

References Cited
UNITED STATES PATENTS 2,404,219 7/1946 Cusic _____ 260—293
3,177,209 4/1965 Holm _____ 260—240

HENRY R. JILES, Primary Examiner
E. D. LEWIS, Assistant Examiner

U.S. Cl. X.R.
260—293.2, 999